(12) United States Patent
Fertman (10) Patent No.: US 8,974,927 B2
(45) Date of Patent: Mar. 10, 2015

(54) POWER AND HYDROGEN GENERATOR

(75) Inventor: Mark Fertman, Toronto (CA)

(73) Assignee: NIM Energy Inc., Toronto (CA)

( * ) Notice: Subject to any disclaimer, the term of this patent is extended or adjusted under 35 U.S.C. 154(b) by 0 days.

(21) Appl. No.: 13/469,942

(22) Filed: May 11, 2012

(65) Prior Publication Data

US 2012/0301751 A1 Nov. 29, 2012

(30) Foreign Application Priority Data

May 25, 2011 (EP) ...................... 11167434

(51) Int. Cl.
| | | |
|---|---|---|
| *C01B 3/08* | (2006.01) | |
| *H01M 6/34* | (2006.01) | |
| *H01M 4/46* | (2006.01) | |
| *H01M 4/42* | (2006.01) | |
| *H01M 4/52* | (2010.01) | |
| *H01M 8/06* | (2006.01) | |

(52) U.S. Cl.
CPC . *H01M 6/34* (2013.01); *C01B 3/08* (2013.01); *H01M 4/42* (2013.01); *H01M 4/46* (2013.01); *H01M 4/521* (2013.01); *H01M 8/065* (2013.01); *Y02E 60/50* (2013.01); *Y02E 60/366* (2013.01)
USPC ............... 429/8; 429/402; 429/403; 429/405; 423/648.1; 423/657; 423/658

(58) Field of Classification Search
USPC ..................... 429/122, 523, 8, 402, 403, 405; 205/305, 464, 771; 423/648.1, 657, 423/658
See application file for complete search history.

(56) References Cited

U.S. PATENT DOCUMENTS

| | | | | |
|---|---|---|---|---|
| 3,036,141 A | * | 5/1962 | Goldenberg et al. | 429/218.1 |
| 3,256,504 A | * | 6/1966 | Fidelman | 204/248 |
| 3,616,335 A | * | 10/1971 | Carson et al. | 205/637 |
| 3,648,668 A | * | 3/1972 | Pacheco | 123/3 |
| 3,892,653 A | * | 7/1975 | Pacheco | 204/238 |
| 3,942,511 A | * | 3/1976 | Black et al. | 126/263.05 |
| 3,957,483 A | * | 5/1976 | Suzuki | 427/180 |
| 4,072,514 A | * | 2/1978 | Suzuki | 420/402 |
| 4,264,362 A | * | 4/1981 | Sergev et al. | 75/243 |
| 4,601,961 A | | 7/1986 | McCartney | |
| 4,822,698 A | | 4/1989 | Jackovitz et al. | |
| 5,004,654 A | | 4/1991 | Hunter et al. | |
| 5,225,291 A | | 7/1993 | Rao | |
| 5,242,565 A | * | 9/1993 | Winsel | 204/265 |

(Continued)

FOREIGN PATENT DOCUMENTS

| | | |
|---|---|---|
| JP | 2003/221201 | 8/2003 |
| WO | WO-02/052664 A2 | 7/2002 |

OTHER PUBLICATIONS

European Search Report dated Nov. 7, 2011 for EP Appl. No. 11167434.7.

*Primary Examiner* — Milton I Cano
*Assistant Examiner* — Lilia V Nedialkova
(74) *Attorney, Agent, or Firm* — Dorsey & Whitney LLP (57) ABSTRACT

An apparatus for producing hydrogen from an electrolyte solution, in particular an aqueous solution, is described. The apparatus includes a hydrogen-developing body having an electrolyte-contacting surface. The electrolyte-contacting surface of the hydrogen-developing body includes regions formed from magnesium, Mg, zinc, Zn, aluminium, Al, or alloys thereof alternating with regions formed from ferrum, Fe, or a ferrous alloy, Fe alloy. The apparatus may further include means for accumulating hydrogen which has developed on the surface of the body.

4 Claims, 5 Drawing Sheets

(56) References Cited

U.S. PATENT DOCUMENTS

| | | |
|---|---|---|
| 5,288,564 A | 2/1994 | Klein et al. |
| 5,316,632 A | 5/1994 | Remppel |
| 5,360,680 A | 11/1994 | Goldman et al. |
| 5,376,471 A | 12/1994 | Hunter et al. |
| 5,405,717 A | 4/1995 | Hasvold |
| 5,415,949 A | 5/1995 | Stone et al. |
| 5,427,871 A | 6/1995 | Garshol et al. |
| 6,127,061 A | 10/2000 | Shun et al. |
| 6,228,527 B1 | 5/2001 | Medeiros et al. |
| 6,372,371 B1 | 4/2002 | Iarochenko et al. |
| 6,656,628 B2 | 12/2003 | Chang et al. |
| 6,834,623 B2 | 12/2004 | Cheng |
| 7,393,440 B2 * | 7/2008 | Ghosh et al. ............... 204/275.1 |
| 7,691,527 B2 * | 4/2010 | Petillo et al. .................. 429/122 |
| 2008/0292540 A1 * | 11/2008 | Wan et al. .................. 423/648.1 |
| 2009/0011297 A1 * | 1/2009 | Jang et al. ....................... 429/19 |

* cited by examiner

POWER AND HYDROGEN GENERATOR

CROSS-REFERENCE TO RELATED APPLICATION

This application claims priority to EP Patent Application No. 11167434.7, filed May 25, 2011. The entire disclosure of the prior application is considered to be part of the disclosure of the instant application and is hereby incorporated by reference herein.

TECHNICAL FIELD

The present invention relates to a power and hydrogen generator, in which seawater and/or an alkaline solution is usable as electrolyte.

BACKGROUND OF THE INVENTION

Electrochemical energy sources in which seawater and/or an alkaline solution is usable as electrolyte are suited for a number of applications. Examples have been ships and other watercraft, electronic devices, toys and the like, and highly promising future applications can be seen on a large scale in the growing field of renewable energies. Various types of so-called seawater cells are known, which use seawater as electrolyte and which comprise a number of basic components, especially a cathode and an anode. One of the known types of a seawater cell is a magnesium/oxygen battery comprising a magnesium anode, which utilizes seawater as electrolyte as well oxygen dissolved in the seawater as oxidizing agent.

The chemical processes taking place in this cell are the following:

On the anode, magnesium is dissolved according to the equation $$2Mg = 2Mg^{2+} + 4e-.$$

On the cathode, oxygen is consumed according to the equation $$O_2 + 2H_2O + 4e- = 4OH-.$$

Summarizing, this can be described in a simplified manner as follows:

$$2Mg + O_2 + 2H_2O = 2Mg(OH)_2.$$

The anode material can be, for example, magnesium, zinc, a mixture of these elements and alloys thereof.

U.S. Pat. No. 4,822,698 discloses an energy cell/battery for use in seawater. This battery works according to the aforementioned electrochemical reactions, with magnesium or zinc being used as anode material and an oxygen electrode as cathode. The oxygen supplied to the cathode is dissolved in the seawater. This seawater battery consists of a cylindrical oxygen electrode cathode. The structure comprises single or several anode rods, which contain magnesium or zinc. The oxygen electrode is similar to those used in many ways in other batteries, e.g. in U.S. Pat. No. 6,372,371 B1. In seawater saturated with air, the disclosed battery is capable of supplying approximately 1.5 volt with 50 mA. The cathode has a size of approximately 800 cm². The battery has a relatively small energy density of about 1 W/m².

U.S. Pat. No. 5,405,717 discloses a seawater cell, the power of which is slightly increased as compared to that of U.S. Pat. No. 4,822,698. This power increase is caused by the effect of waves, which increases the flow of the seawater through the cathode so as to supply oxygen. The cell structure includes water flow conducting means, which make the water flow through the cell. U.S. Pat. No. 5,225,291 discloses a seawater battery, which is operable with or without dissolved oxygen due to the use of a hybrid cathode. U.S. Pat. No. 5,427,871 relates to galvanic seawater cells and batteries, respectively, which use oxygen dissolved in the seawater as oxidizing agent.

Another galvanic type of seawater batteries, in which normally seawater is used as an electrolyte, comprises a magnesium anode and a cathode of copper chloride or silver chloride. These long-term batteries do not need oxygen dissolved in seawater, but they have a small output energy density, are generally heavy and require much space. A Mg/CuCl battery with a watt-year as output energy may have a length of 8½ feet, a diameter of 9 inches and a weight of approximately 100 pounds. Moreover, these batteries have a limited flexibility with respect to the design and are restricted to a longitudinal shape. Examples are described in U.S. Pat. Nos. 4,601,961, 5,288,564, or U.S. Pat. No. 6,656,628 B2.

Metal-air cells may be primary cells, comprising an anode made of metal, e.g. of aluminium, magnesium or zinc, and an air cathode, which is disposed with a small spacing from the metallic anode, but does not touch the same. A suited electrolyte is provided in a space between the cathode and anode. The anode is immersed into the electrolyte. Different embodiments of such batteries and methods for the production and use of such batteries are known from the prior art, compare, for example, U.S. Pat. Nos. 5,004,654, 5,360,680, 5,376,471, 5,415,949, 5,316,632. Typical metal-air batteries and metal-air fuel cells, respectively, are described, for example, in U.S. Pat. No. 6,127,061.

Besides their use in the above-referenced electrical energy generators, magnesium or electrochemically related metals and their alloys, placed in aqueous solutions, have been used to generate hydrogen, which is being considered as an important energy source of the future. Basic concepts in this regard have been developed by Pacheco, e.g. in U.S. Pat. No. 6,834,623. In JP 2003 221 201 A hydrogen generating device is disclosed, which contains magnesium alloy particles consisting of granular magnesium and a plurality of catalytic nickel or iron particulates on the surface and at the inside of the granular magnesium in a closed reactor vessel.

SUMMARY

Embodiments of the present invention provide an improved electrochemical energy source, which specifically also serves as a hydrogen source, constructed in a simple manner and being highly efficient.

As will be described in more detail below, embodiments of the invention include an arrangement for producing hydrogen and, more specially, an electrochemical arrangement for producing hydrogen and generating electrical power. Likewise, a process for producing hydrogen and, more preferably, for producing hydrogen and electrical power, are being described herein.

Some embodiments of the invention include in the arrangement, a hydrogen-developing body in or on the electrolyte-contacting surface of which regions formed from magnesium, Mg, or the like, or an alloy thereof alternate with regions formed from ferrum, Fe, or a ferrous alloy, Fe alloy, or the like. Herein, the wording "or the like" designates chemical elements or alloys therefrom which in the electrochemical behaviour are close to magnesium on the one hand or close to ferrum on the other and which, therefore, could replace magnesium on the one hand and ferrum on the other, in their respective functions. Among others, zinc, Zn, can, in principle, be used to replace magnesium, whereas on the other hand carbon might replace ferrum or, more specifically, steel.

In an embodiment of the invention, the electrolyte-contacting surface of the body comprises at least a first sheet formed from Mg or a Mg alloy and a second sheet formed from Fe or a Fe alloy, the first and second sheet being closely bonded to each other, wherein the first or the second sheet is basically continuous and correspondingly the second or the first sheet comprises a plurality of apertures, the surface of the basically continuous sheet being capable to contact the electrolyte solution through the apertures of the non-continuous sheet. In an alternative embodiment, the regions formed from ferrum or the like can be deposited on an substrate made from magnesium or the like by means of a deposition process, e.g. a galvanic process.

In another embodiment, the hydrogen-developing body is plate-shaped and comprises at least one of islands, strips, meanders, and a grid of Fe or Fe alloy, in particular of steel, in or on a matrix of Mg or Zn or a Mg or Zn alloy, or vice versa. In an alternative embodiment, the hydrogen-developing body is cylinder-shaped and comprises at least one of islands, strips, meanders, a grid, rings and a helix of Fe or Fe alloy, in particular of steel, in or on a matrix of Mg or Zn or a Mg or Zn alloy, or vice versa.

Still further, in preferred embodiments a plurality of hydrogen developing bodies, in particular plate-shaped bodies in a face-to-face configuration or cylinders in a coaxial configuration, can be included in the arrangement. Each of the hydrogen-developing bodies includes two electrolyte-contacting surfaces. Each of the hydrogen-developing bodies is formed from a continuous first sheet and two non-continuous second sheets, each of the two non-continuous second sheets boded to opposite sides (surfaces) of the continuous first sheet to define each of the two electrolyte contacting surfaces.

In all of the above mentioned arrangements, hydrogen gas is developed along the respective surface regions formed from magnesium or a Mg alloy or the like, and this process runs in a more efficient way, and almost pure hydrogen gas can be obtained in an easier way than in prior art hydrogen generators, basically without additional purification from oxygen, which is being generated together with the hydrogen.

Still further, the proposed arrangement comprises means for accumulating hydrogen which has been developed on the surface of the body. In a preferred embodiment, the means for accumulating hydrogen comprise actively driven exhaustions means.

According to a process aspect of an embodiment of the present invention, an arrangement as described above is being set in a container comprising the electrolyte solution or in a flow of the electrolyte solution, and the hydrogen developed on the surface of the body or bodies is being accumulated. In such process, salt water, waste water or tap water is used as an electrolyte solution.

In a further embodiment of the proposed arrangement, preferably to be used in combined renewable energy systems, the body or at least part of the bodies for developing hydrogen is arranged as an anode of an electrochemical cell and at least one cathode is provided and electrically connected to the anode or anodes, respectively, wherein the anode/s and cathode/s are arranged to form a metal/air type cell consuming oxygen. More specifically, in a further embodiment the cathode or cathodes, respectively, are arranged in close spatial relationship to the anode or anodes, respectively, in particular in a stack of alternating plate-shaped cathodes and anodes or a coaxial cylindrical arrangement of alternating cathodes and anodes.

The arrangement comprises electrically driven exhaust means which are connected to the metal/air type cell, preferably via energy buffering means.

In a still further embodiment hydrogen storing means are connected directly to the means of accumulating hydrogen, without means for purifying the gas developed by the arrangement. Correspondingly, under process aspects it is proposed that the hydrogen developed on the surface of the body or bodies is being accumulated without external purification and/or at least part of the electrical power produced by the arrangement is used for exhausting the hydrogen into hydrogen storing means.

The arrangements proposed herein may comprise a single cell or a plurality of cells and, moreover, additional suited components/frames/casings/ and devices, such as DC/DC converters or the like. The (or each) anode is arranged with a small spatial distance from the cathode, that is, it is spaced apart from the same, but does not touch the cathode. An electrolyte is provided between the anode and cathode.

The anode is made of a material selected from the group consisting of aluminium, zinc, magnesium and alloys thereof. In addition, effective amounts of additives may be provided of Ga, In, Sn, Cd, Pb. Preferably, the air/gas diffusion cathode comprises several layers, namely at least one current collector mesh, a gas-impermeable, hydrophilic, active layer with a high-dispersion porous carbon and a gas-permeable, hydrophobic layer.

In a further embodiment, the hydrogen-developing body or hydrogen-developing bodies is/are arranged in a hermetically closed reactor vessel, the reactor vessel comprising a water inlet, a hydrogen outlet, and a steam outlet and control means for controlling the intake of the aqueous solution and the output of steam produced in the reactor body in an exothermal reaction at the electrolyte-contacting surfaces of the hydrogen-developing body or bodies. Preferably, the control means comprise start/stop means for starting or stopping the hydrogen production and steam generation.

In an embodiment of a power supply system, the steam outlet is, via steam connection control means, selectively connected to a steam machine and the hydrogen outlet is, via hydrogen connection control means, selectively connected to hydrogen storing means and/or a fuel cell and/or hydrogen driven machine.

The casing of the arrangement, which may be made of plastics, may comprise one or more frames or frame-like structures, on which the cathodes are each mounted in a liquid-tight manner. In a preferred embodiment the walls of the casing space form, at least approximately, a cuboid. As will be appreciated by the person skilled in the art, of course, other shapes are feasible as well, like that of a cylinder. Preferably, at least two opposite walls of the casing space are formed, at least region-wise, by the especially plate-shaped cathodes or the hydrophobic layers of the cathode, respectively.

In a further embodiment of the process, at least part of internal pressure developed in the container is used for outputting pressurized hydrogen, to drive a hydrogen-driven machine or to press hydrogen into hydrogen storing means or into a fuel cell and/or for outputting pressurized steam, to drive a steam machine.

BRIEF DESCRIPTION OF THE DRAWINGS

Further embodiments and advantages, as well as various aspects of the invention, become apparent from the following description of embodiments of the invention according to the figures.

DETAILED DESCRIPTION

Figure 1A:
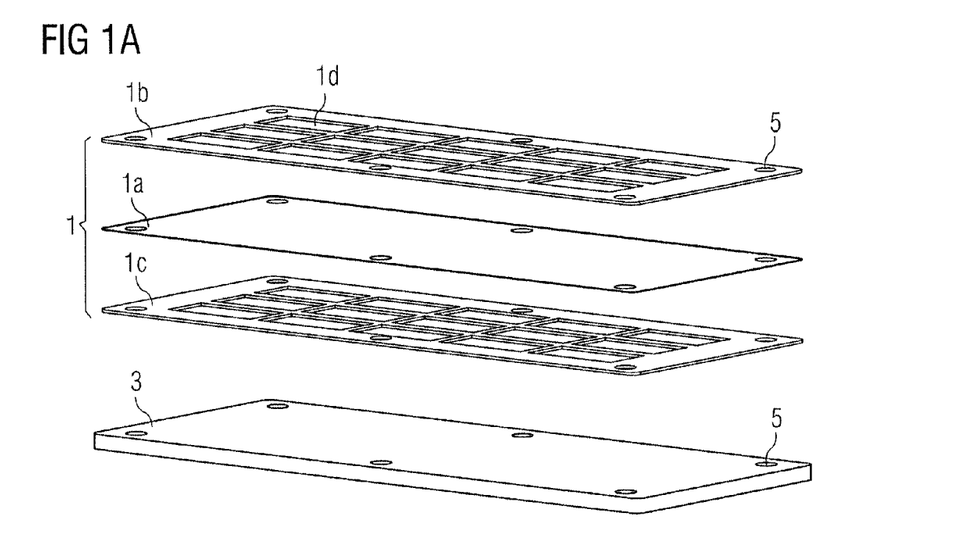
FIG. 1A shows the components and FIG. 1B shows an assembled stack of alternating anodes and cathodes of an embodiment of the inventive arrangement for producing hydrogen and generating electrical power according to an embodiment of the invention.

FIG. 1A shows a multi-layered anode 1 and a cathode 3 of a metal-air type battery (not shown as such). The anode 1 comprises a basic or intermediate metal sheet 1a, made of steel, and two outer metal sheets 1b, 1c, both made from a Mg alloy and comprising a regular pattern of apertures 1d. Besides these regular apertures, all sheets of the anode 1, as well as the cathode 3, comprise mounting holes 5 close to their respective corners and longer edges.

Figure 1B:
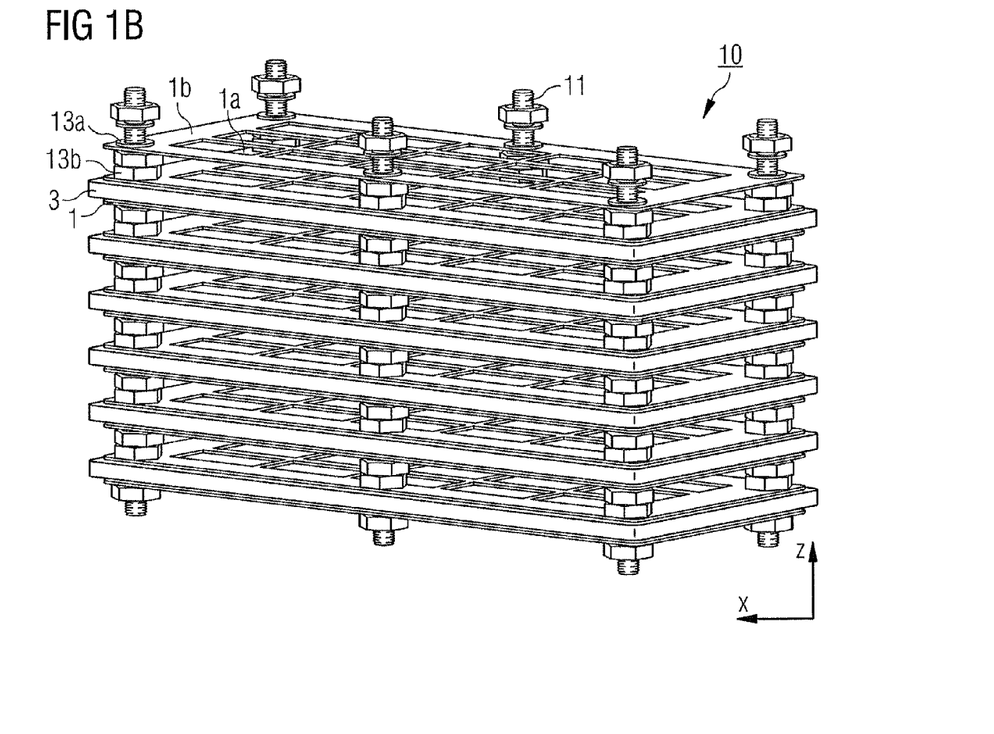

FIG. 1B shows an assembled stack of anodes 1 and cathodes 3, to be used as the core component of a metal-air type battery. The stack 10 is being assembled by means of bolts 11 which are inserted into the mounting holes 5 of the layered anodes 1 and cathodes 3, with spacers 13a, 13b of different height inserted therebetween. In this stack, the intermediate sheet 1a and outer sheets 1b, 1c of the anode 1 are being pressed against each other without any spacing therebetween, whereas the smaller spacers 13a maintain a predetermined gap between the anodes 1 and cathodes 3 of each sub-stack, which comprises a central cathode and two anodes. The larger spacers 13b maintain a larger gap between each of these sub-stacks. In use, an electrolyte is contained or flows between the respective gaps between the anodes and cathodes or the sub-stacks, respectively.

Figure 2:
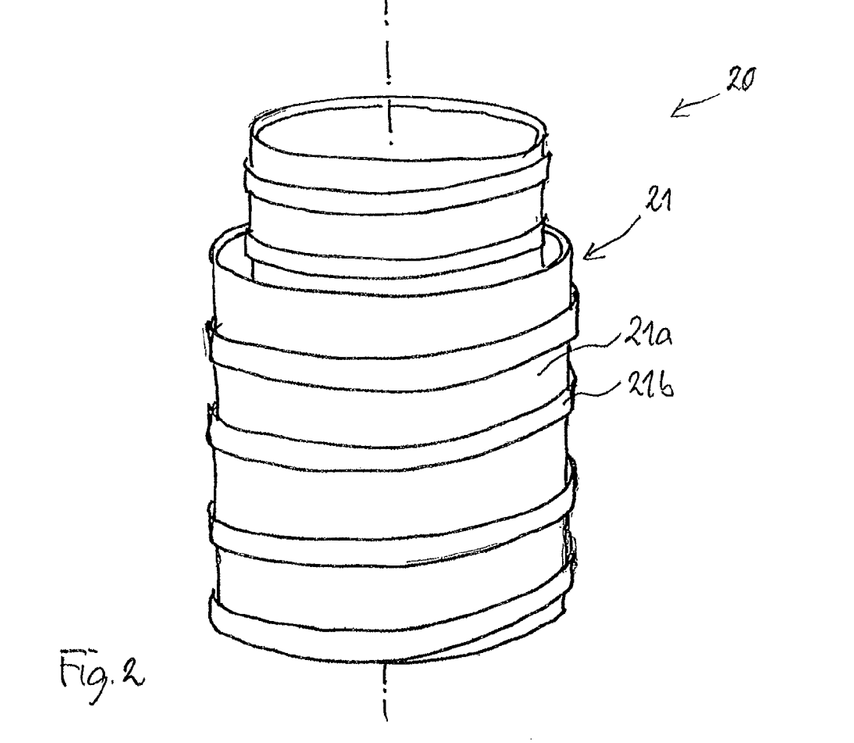
FIG. 2 is a schematic perspective view of an arrangement of hydrogen-developing bodies according to an embodiment of the invention.

FIG. 2 schematically shows a coaxial cylindrical arrangement 20 of hydrogen-developing bodies (i.e. cylinders) 21, each of which is made from a magnesium cylinder 21a, which may be formed by a press moulding or extruding technique and a steel helix 21b which is wound around the respective magnesium cylinder core 21a and attached thereto. It may be attached simply be means of an elastic force exerted to the magnesium core cylinder if the helix is made as a steel spring with a smaller diameter than that of the magnesium core and put onto the core in a widened state. Such embodiment has, incidentally, an advantage insofar as the steel helix adapts its diameter to a reducing diameter of the magnesium core, which is the result of Mg consumption in the process of hydrogen production. However, it is also possible to use specific fastening means, to fix the steel helix to the core cylinder.

Figure 3:
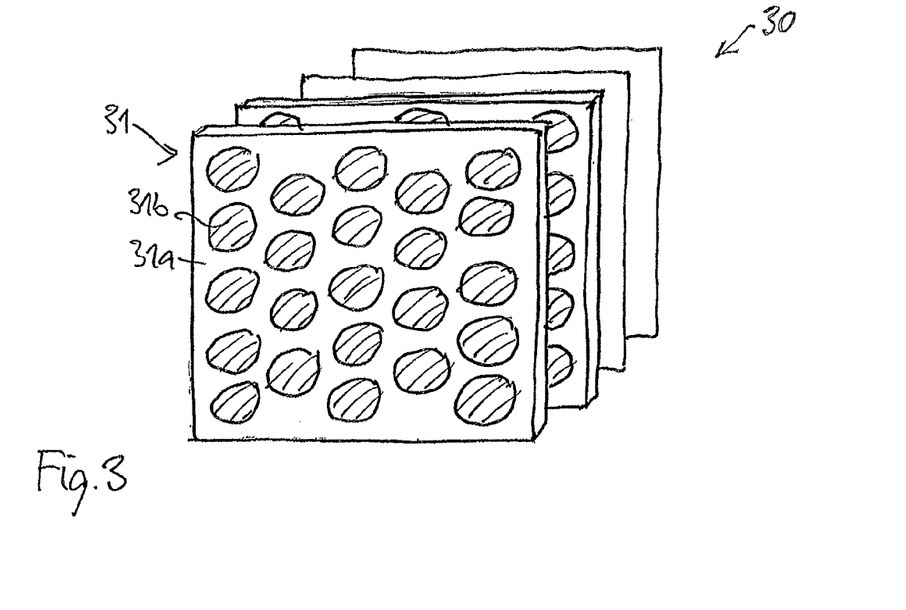
FIG. 3 is a perspective view of an arrangement of hydrogen-developing bodies according to an embodiment of the invention.

FIG. 3 shows a stack 30 of plate-shaped hydrogen-developing bodies 31, each of which consists of a magnesium plate 31a and nickel islands 31b deposited thereon in a regular array, e.g. by means of a galvanic process.

Figure 4:
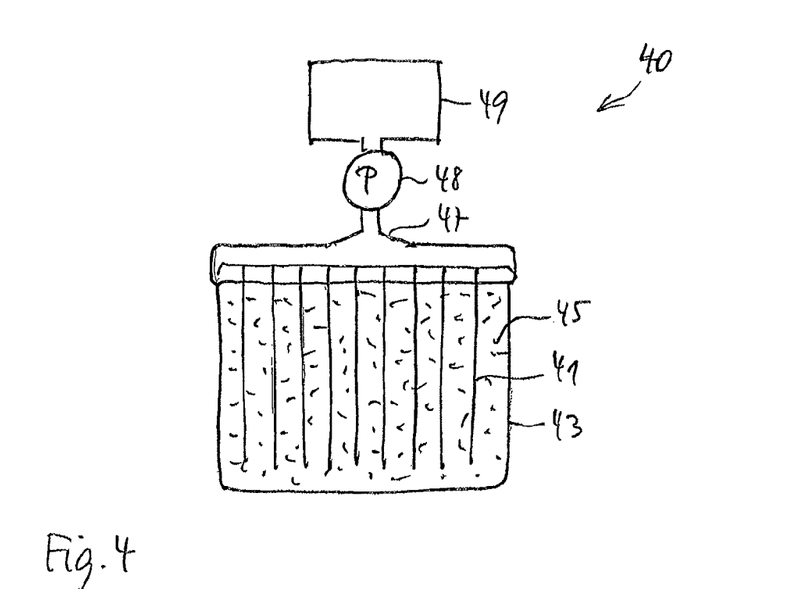
FIG. 4 is a schematic illustration of an arrangement for producing hydrogen according to an embodiment of the invention.

FIG. 4 schematically shows an arrangement 40 for generating hydrogen. The arrangement comprises a plurality of hydrogen-developing plates 41, arranged in parallel to each other in a container 43 which is filled with an aqueous electrolyte 45. The container 43 has an outlet 47 which is connected, through a pump 48, to a gas tank 49 for storing the hydrogen which is generated at the surfaces of the hydrogen-generating plates 41.

Figure 5:
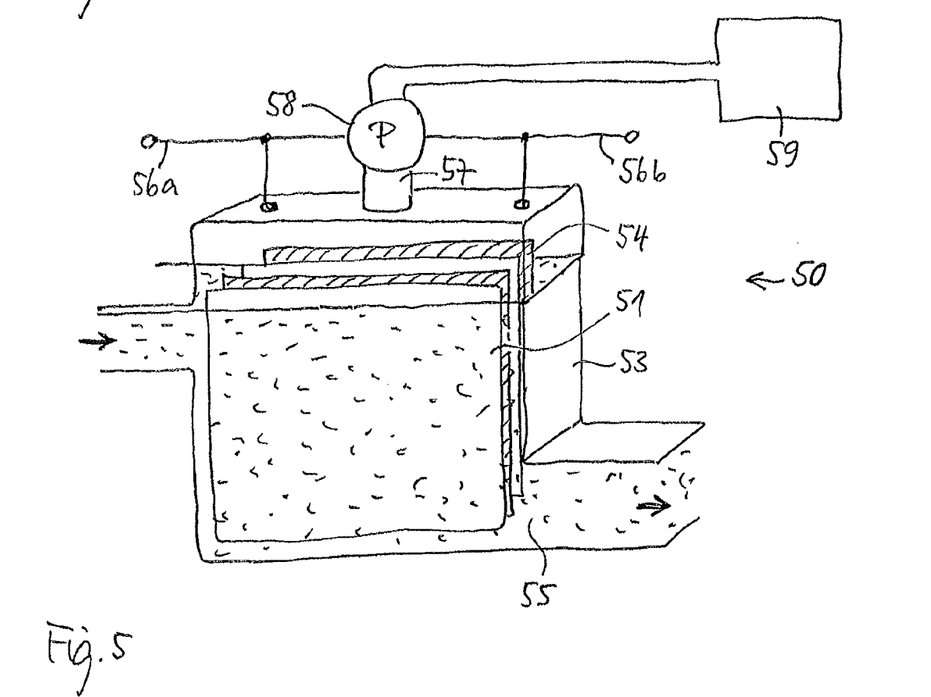
FIG. 5 is a schematic illustration of an arrangement for producing hydrogen and generating electrical energy, as a multivalent energy source according to an embodiment of the invention.

FIG. 5 shows a more complex and more sophisticated arrangement 50 for producing hydrogen and generating electrical power, which comprises a flow cell 53 wherein a stack of hydrogen-developing plates 51 (similar to that of FIG. 4) is arranged in a flow of an electrolyte 55, e.g. salt water. Alternating with the hydrogen-developing bodies 51, which act as anodes, cathode plates 54 are provided in the flow cell 53 and in the electrolyte flow 55, electrically connected to the anodes in a battery-type circuit (not shown). As in the embodiment of FIG. 4 and described above, the flow cell 53 has a gas outlet 57, a gas pump 58 and a gas tank 59 for exhausting and storing the hydrogen which is produced for the arrangement. Additionally, electrical outputs 56a, 56b are provided, on the one hand for driving the pump 58 with electrical power which is generated within the arrangement, and for feeding remaining electrical energy to external loads, e.g. a boat or submarine drive system.

Figure 6:
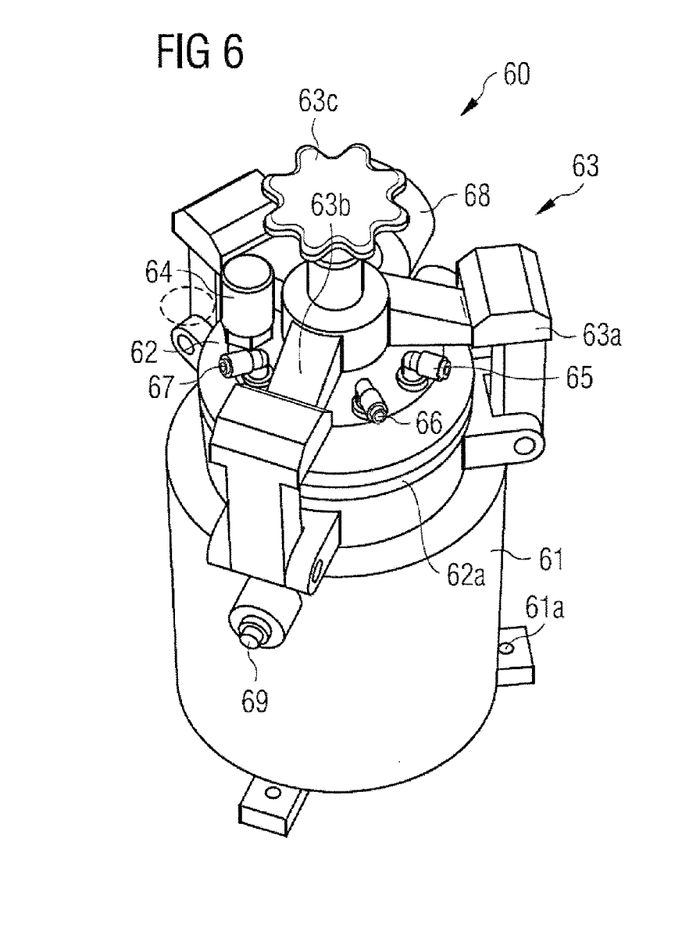
FIG. 6 is a schematic perspective view of a reactor vessel for producing hydrogen and steam according to an embodiment of the invention.
Figure 7:
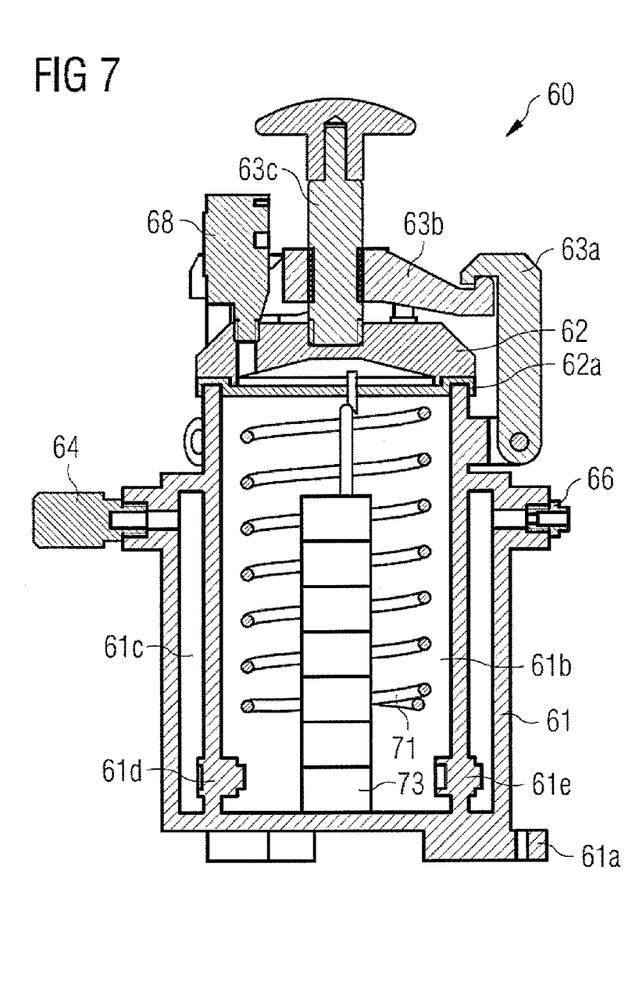
FIG. 7 is a sectional view of the reactor vessel of FIG. 6.

FIGS. 6 and 7 show a perspective view or sectional view, respectively, of a hydrogen and steam generator 60, which may comprise a hydrogen-developing body or hydrogen-developing bodies as described above in detail but which can likewise contain a different hydrogen-developing arrangement. The reactor 60 comprises a thick-walled reactor vessel 61 having fastening means 61a for mounting it to a base, a vehicle body or similar. The reactor has a power locked lid or cover 62 comprising a seal 62a. To withstand a high pressure which may develop inside the vessel, robust locking means are provided at the cover, namely a three-armed clamp 63 comprising three pivotable clamping brackets 63a, a central clamping bridge 63b and a central locking screw 63c. For safety reasons, for limiting the pressure inside the vessel, in the cover 62 or at the wall of the vessel 61a safety valve 64 is provided.

At the cover 62 (as shown in FIG. 6) or at the reactor vessel body 61 (as shown in FIG. 7), several inlets/outlets are provided, namely a water intake valve 65, hydrogen outlet valve 66 and steam outlet valve 67 (not all of which are shown in FIG. 7). A pressure gauge 68 is provided in the cover, both for safety and control purposes, and a control port 69 is provided at the side wall of the reactor vessel 61.

As can be seen in FIG. 7, the reactor vessel 61 is double-walled, thus defining an inner reactor compartment 61b and an outer reactor compartment 61c, which are connected to each other by an intake check valve 61d and an outlet check valve 61e. In the inner compartment 61b, a steam coil 71 and a fuel element (hydrogen-developing arrangement) 73 are contained. Whereas the inner compartment or chamber, respectively, 61b thus serves as hydrogen and steam developing chamber, the outer compartment or chamber, respectively, 61c is used for controlling the reaction by means of the automatic in/out check valves 61d, 61e.

The fuel element 73 being placed in the reactor, the inner compartment 61b is filled with water and locked, and the subsequent exothermal reaction produces pure hydrogen and heats the inner chamber, thus producing steam in the steam coil 71.

Figure 8:
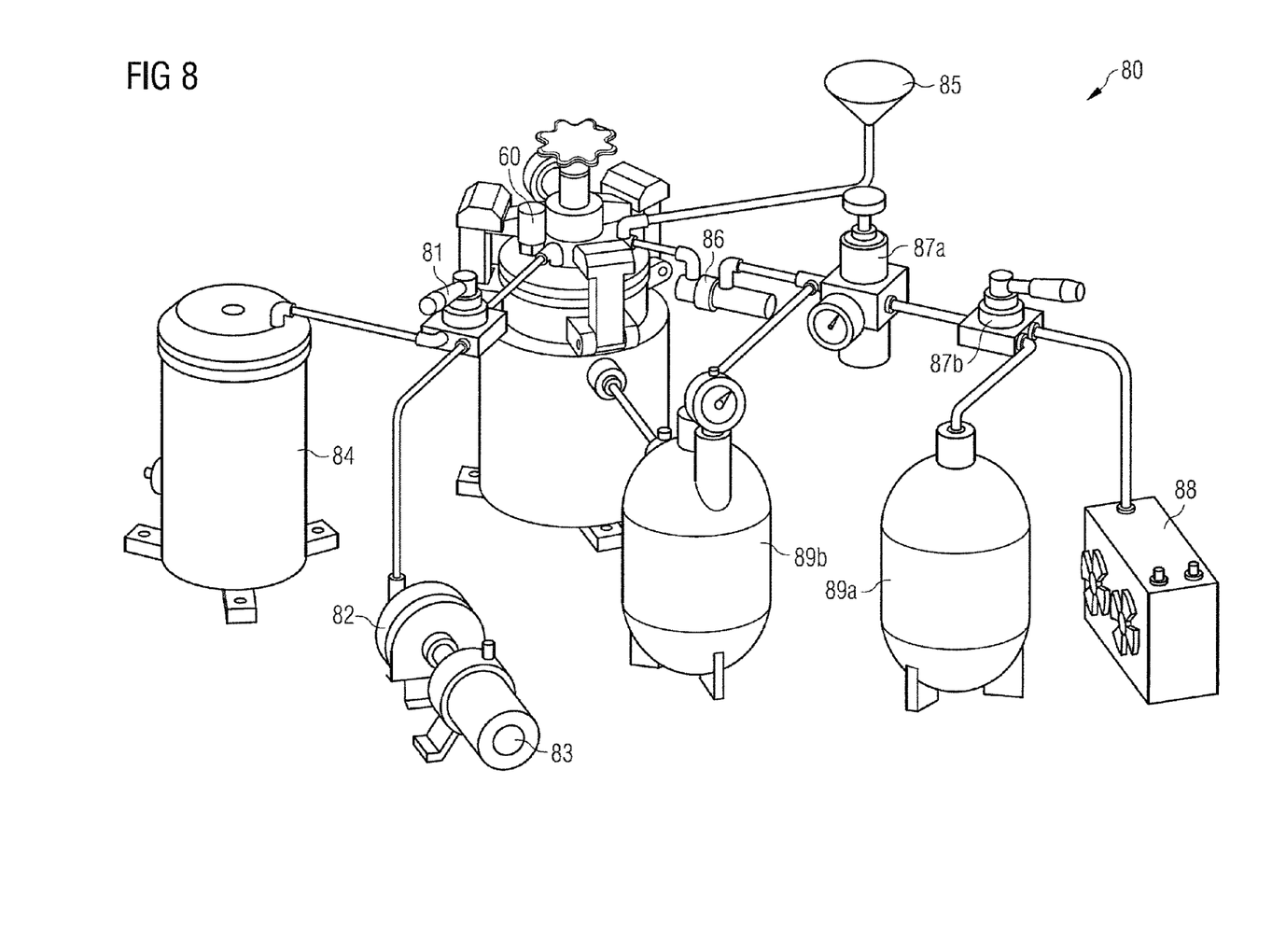
FIG. 8 is a perspective view of a system comprising a reactor vessel of FIGS. 6 and 7.

FIG. 8 schematically illustrates a power supply system 80, the core part of which is the reactor 60 described above. The steam outlet of the reactor 60 is, via a control valve 81, connectable to a steam turbine 82 driving a power generator 83 and/or to a condenser 84. The water inlet of the reactor 60 is connected to a water reservoir 85, which may contain and deliver sea water or waste water or, under certain provisions, even tap water to the reactor.

The hydrogen outlet of the reactor is, via a pneumatic machine 86 and to further control valves 87a, 87b, selectively connectable to a fuel cell 88 and a hydrogen tank 89a and/or control tank 89b. Depending on the hydrogen output and pressure delivered by the reactor, this arrangement can be controlled to deliver a maximum electrical power output by operating the pneumatic machine 86 and/or the fuel cell 88 and/or to store at least part of the produced hydrogen in a respective tank. The pneumatic machine 86 can be of the magnetic piston air cylinder type or another well-known type or being embodied by a second small turbine unit.

A system as shown in FIG. 8 can well be adapted to a large variety of applications and being scaled correspondingly, including stationary small or mid-sized power plants, land vehicle drives and boat or submarine drives.

The embodiments and aspects of the invention explained above are not determined to limit the scope of the invention, which is exclusively to be determined by the attached claims. Many modifications of the inventive concept are possible within the scope of the claims and, more specifically, arbitrary combinations of the several claim features are considered to be within the scope of the invention.

What is claimed is:

1. An apparatus for producing hydrogen from an aqueous electrolyte solution, the apparatus comprising:
    a plate-shaped hydrogen-developing body comprising at least one from the list of islands, strips, meanders, and a grid of magnesium (Mg), zinc (Zn), or alloys thereof in or in contact with a matrix of iron (Fe) or Fe alloy; and
    an outlet for accumulating hydrogen which develops on the plate-shaped hydrogen-developing body when the plate shaped hydrogen-developing body is provided in contact with an aqueous electrolyte solution, wherein the plate-shaped hydrogen-developing body is one of a plurality of hydrogen-developing bodies, the plurality of hydrogen-developing bodies configured as plate-shaped bodies in a face-to-face configuration, wherein each of the plurality of hydrogen-developing bodies comprises two electrolyte-contacting surface formed as a pair of opposite surfaces of a continuous first layer and a non-continuous second layer, such that the non-continuous second layer is bonded to the continuous first layer, wherein the continuous first layer is the matrix of Fe or Fe alloy and the non-continuous second layer is the at least one from the list of islands, strips, meanders, and a grid of Mg, Zn, or alloys thereof.

2. The apparatus according to claim 1, wherein the outlet for accumulating hydrogen further comprises a pump.

3. An apparatus for producing hydrogen from an aqueous electrolyte solution, the apparatus comprising:
    a cylinder-shaped hydrogen-developing body comprising at least one from the list of islands, strips, meanders, a grid, rings and a helix of Fe or Fe alloy in or in contact with a matrix of Mg, Zn, a Mg alloy or a Zn alloy, or at least one from the list of islands, strips, meanders, and a grid of Mg, Zn, or alloys thereof in or in contact with a matrix of Fe or Fe alloy; and
    an outlet for accumulating hydrogen which develops on the cylinder-shaped hydrogen-developing body when the cylinder shaped hydrogen-developing body is provided in contact with an aqueous electrolyte solution, wherein the cylinder shaped hydrogen-developing body is one of a plurality of hydrogen-developing bodies, the plurality of hydrogen-developing bodies configured as cylinders in a coaxial configuration, wherein each of the plurality of hydrogen-developing bodies comprises two electrolyte-contacting surfaces formed as a pair of opposite surfaces of a continuous first layer and a non-continuous second layer, such that the non-continuous second layer is bonded to the continuous first layer, wherein the continuous first layer is the matrix of Mg, Zn, Mg alloy or Zn alloy and the non-continuous second layer is the at least one from the list of islands, strips, meanders, grid, rings and helix of Fe or Fe alloy, or the continuous first layer is the matrix of Fe or Fe alloy and the non-continuous second layer is the at least one from the list of islands, strips, meanders, and grid of Mg, Zn, or alloys thereof.

4. The apparatus according to claim 3, wherein the outlet for accumulating hydrogen further comprises a pump.

* * * * *